Figure 1:
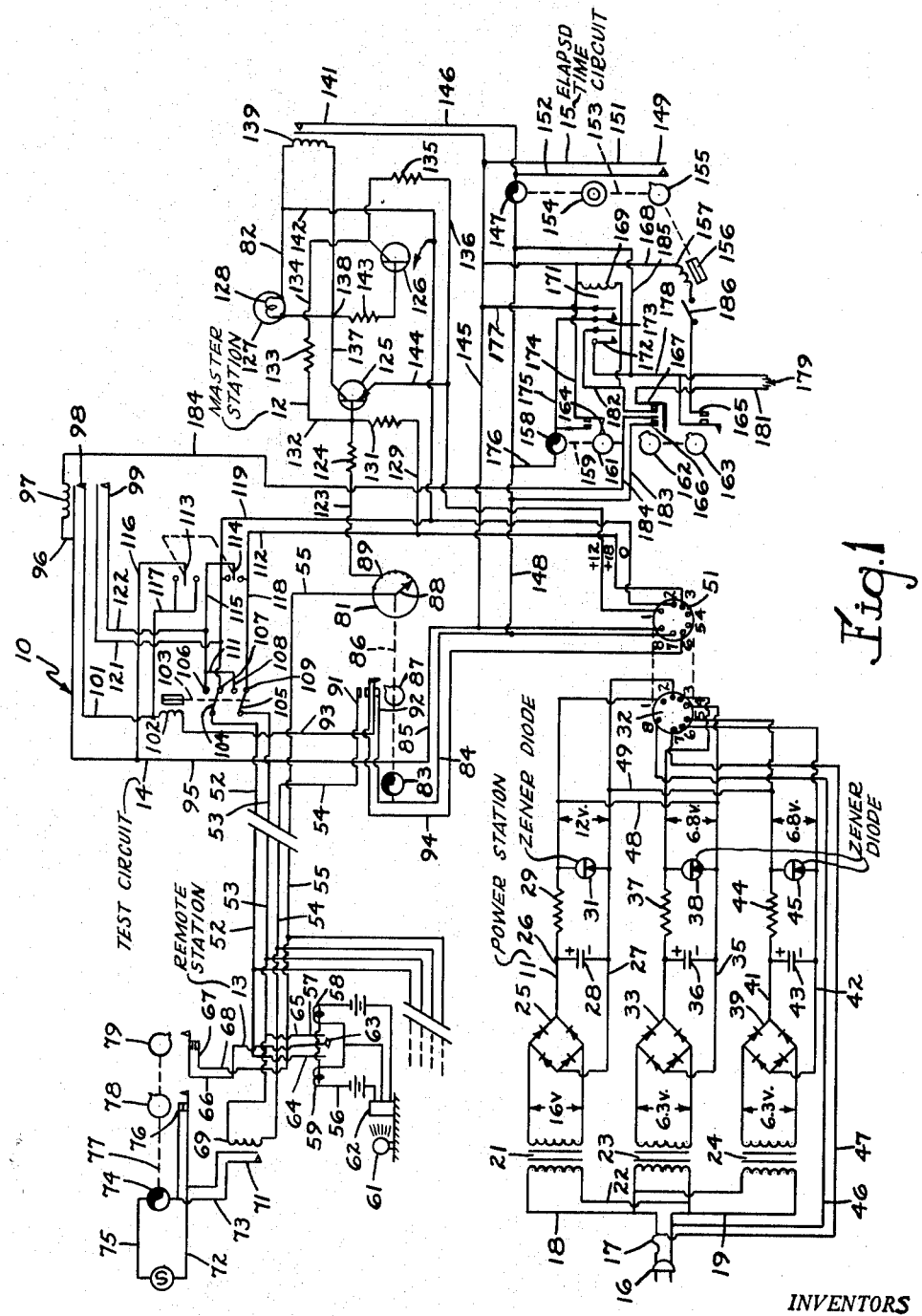

Jan. 25, 1966

R. G. KRAMER ETAL 3,231,879

CONDITION RESPONSIVE SYSTEM WITH TEST MEANS

Filed Sept. 26, 1961

2 Sheets-Sheet 1

INVENTORS
Roger G. Kramer
CHANDLER H. WATERMAN
BY
Attorney

INVENTORS
Roger J. Kramer
Chandler H. Waterman
BY [signature]
Attorney

United States Patent Office 3,231,879
Patented Jan. 25, 1966

3,231,879
CONDITION RESPONSIVE SYSTEM WITH TEST MEANS
Roger G. Kramer, Gardner, and Chandler H. Waterman, Athol, Mass., assignors to Simplex Time Recorder Company, Gardner, Mass., a corporation of Massachusetts
Filed Sept. 26, 1961, Ser. No. 140,800
4 Claims. (Cl. 340—214)

This invention relates to a supervisory system and more particularly to apparatus arranged to transmit indications of conditions to a central station from a plurality of remote stations.

There are a number of fields in which it is desirable to have an indication at a central station of the condition of elements at various remote stations. Such an indication might, for instance, involve the lighting or non-lighting of a lamp on a panel board in the central station to show whether a certain condition exists or not at each of a plurality of positions some distance away. Such a condition may exist, for instance, in the case of a large plant in which it is desirable to know during the night whether certain lights are "on" or "off." A similar situation might exist in a machine shop in which a supervisor would like to know which machines in the plant are operating at a given time. In a steam generating plant it might be desirable to know whether certain valves are open or closed. A supervisory system of this type is desirable because it makes it unnecessary for an employee to walk from one remote station to another to check the desired condition. Supervisory systems of this type that have been available in the past have suffered from a number of deficiencies, however. For one thing, they have required a large number of wires and this factor has made the system very expensive, particularly where the remote stations have been a considerable distance from the central station. Furthermore, the known systems have been difficult to maintain because of the complex electrical circuitry involved. In addition, they have lacked the ability to keep a permanent record of the length of time during a given day that any one of the remote station subjects has been in a given condition. An example of such desirable information would be the total length of time that an intermittently-operated machine has been running. Also, one of the difficulties experienced with the prior art supervisory systems is that a circuit difficulty in a remote station circuit may cause it falsely to indicate a certain condition and a considerable time may pass before this false indication is discovered. These and other difficulties experienced with the prior art devices have been obviated in a novel manner by the present invention.

It is, therefore, an outstanding object of the invention to provide a supervisory system which gives positive status indication, which has a high degree of accuracy, which is relatively simple to construct, which is simple to install, which requires very little maintenance, and which is inexpensive.

Another object of this invention is the provision of a supervisory system in which a small number of wires is required for connecting a central station to a large number of remote stations, these wires being of very small gage, and being of the same in number irrespective of the number of remote stations to be supervised.

Another object of this invention is the provision of a supervisory system having a means for checking the operability of the circuitry at the remote stations.

With these and other objects in view, as will be apparent to those skilled in the art, the invention resides in the combination of parts set forth in the specification and covered by the claims appended hereto.

Figure 2:
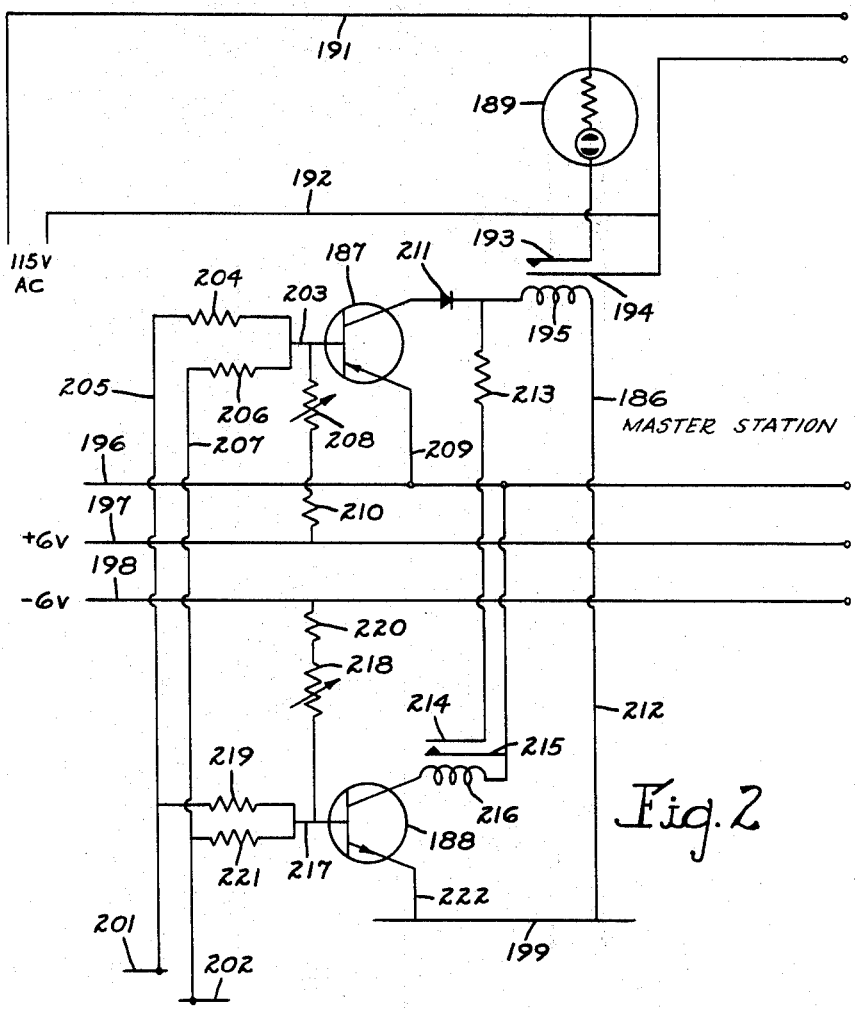

The character of the invention, however, may be best understood by reference to certain of its structural forms, as best illustrated by the accompanying drawings in which:

FIG. 1 is a schematic view of the supervisory system embodying the principles of the present invention; and FIG. 2 is a schematic view of a modified form of a portion of the system.

Referring first to FIG. 1, which shows the general features of the invention, the supervisory system, indicated generally by the reference numeral 10, is shown as consisting of a power supply 11, a master station 12, at least one remote station 13, a test circuit 14, and an elapsed time circuit 15.

Power supply

The power supply 11 is provided with a plug 16 adapted to be connected to a source of 115-volt alternating current electricity (not shown). One prong of the plug is connected through a fuse 17 to a line 18. The other prong of the plug is connected to a line 19. The line 18 is connected to one side of the primary of a transformer 21 and the other side is connected through a line 22. The primary winding of a transformer 23 is also connected from the line 18 to the line 19 and across these same two lines is connected the primary winding of another transformer 24. The secondary of the transformer 21 is connected to the input of a rectifying network 25, the output of which is connected to line 26 and 27. A capacitor 28 is connected across the lines 26 and 27 and a variable resistor 29 is connected in the line 26, the capacitor and resistor forming a filter circuit. A voltage-regulating zener diode 31 is connected across the lines 26 and 27, the line 26 is connected to post #1 of a plug 32, while the line 27 is connected to post #2 of the same plug. The secondary winding of the transformer 23 is connected to a rectifying network 33, the output of which is connected to lines 34 and 35. A capacitor 36 across the lines and a variable resistor 37 in the line 34 form a filter network in the usual way, and a voltage-regulating zener diode 38 is connected across the lines. The end of the line 34 is connected to post #3 of the plug 32, while the line 35 is connected to post #4 of the plug. The secondary windings of the transformer 24 are connected to the input of a rectifying network 39, the output of which is connected to lines 41 and 42. A capacitor 43 across the lines and a variable resistor 44 in the line 41 form a filter, while a zener diode 45 connected across the lines serves to control voltage. The line 41 is connected to the post #5 of the plug 32, while the line 42 is connected to the post #6. A line 46 is connected to the line 19 on one end and at the other end to post #8 of the plug, while a line 47 is connected to the line 18 at one end and to the post #7 of the plug 32 at the other end. A line 48 joins the line 26 to the line 35 so that the plus side of the 12 volt portion is at the same potential as the negative side of the 6.8 volt portion. In a similar manner, a line 49 joins the line 27 to the line 41. The plug 32 is adapted to be connected to a mating plug 51 and it is to be noted that no wires are connected to posts 4 and 5 of the plug 51 due to the fact that these points are already common to the posts 1 and 2, respectively.

Remote station

Each remote station 13 is connected to four lines 52, 53, 54, and 55, arriving from the master station. A status switch 56 is provided to show the condition of the element which is to be supervised. In the present case, the status switch consists of a relay 57 having two coils 58 and 59. The condition to be supervised in this case is indicated as an electric light 61 adapted to shine on a photoelectric cell 62. The cell is connected through low-voltage power sources to the coils 58 and 59 in such a manner that the coil 59 is energized when the photoelectric cell 62 indicates that the light 61 is "on," while the coil 58 is actuated when the photoelectric cell 62 indicates that the light 61 is "off." The coils 58 and 59 operate a movable element 63 of the relay. The movable element contacts either a contactor 64 or a contactor 65. The contactor 64 is connected to the line 52 while the contactor 65 is connected to the line 53. The movable element 63 is connected by a line 66 to one side of a normally open switch 67, the other side of which is connected by a line 68 to the line 55 going back to the master station. The lines 53 and 54 are connected to opposite ends of the coil 69 of a normally open relay 71. One side of the contactor of the relay 71 is connected to the line 72 which, in turn, is connected to a local source of 115 volts A.C. electricity. The other side of the contactors of the relay 71 is connected through a line 73 to one side of a motor 74, the other side of which is connected by a line 75 to the other side of the local alternating current source. Across the lines 72 and 73 is connected a normally closed switch 76. The motor 74 is provided with a shaft extension 77 on which are mounted two cams 78 and 79 each having a small protrusion or abutment adapted during rotation of the shaft 77 to contact the switches 76 and 67, respectively. The abutment on the cam 78 opens the normally closed switch 76 at a certain time in the rotation of the motor 74, while the abutment on the cam 74 closes the normally open switch 67 at a different time. The motor 74 and the cams 78 and 79 are adapted to rotate at the speed of one revolution per minute. It will be understood that a large number of similar remote stations 13 will be connected to the lines 52, 53, 54, and 55 in the same manner.

Master station

The master station 12 consists of a scanner 81 connected to as many indicator or lamp circuits 82 as there are remote stations. The scanner is provided with a motor 83 which is connected by lines 84 and 85 to the posts #7 and #8 of the plug 51, the motor being designed to operate at 5/6 of a revolution per minute. The motor is provided with a shaft extension 86 on which is mounted a cam 87 having a single finger or abutment. Also mounted on the shaft extension is a rotary contact arm 88 of a rotary switch having a number of contactors 89 which make electrical connection on occasion with the contact arm 88. The contact arm 88 is electrically connected to the line 55. Overlying the cam 87 in position to be operated by the abutment thereof is a normally open switch 91 and a normally closed switch 92. One side of the normally closed switch 92 is connected to the line 84, while the other side is connected to a line 93. One side of the normally open switch 91 is connected to a line 94, the other end of which is connected to the post #6 of the plug 61 and, therefore, carries a minus 6-volt charge. The other side of the normally open switch 91 is connected to the line 54. The line 85 is connected by a line 95 to the test circuit 14.

Test circuit

The test circuit 14 includes a relay 96 having a coil 97, a normally open contactor 98 and a normally open contactor 99. One side of the coil 97 and of the normally open contactor 98 is connected to the line 95. The other side of the contactor 98 is connected by a line 101 to one side of the coil 102 of a relay 103. The other side of the coil 102 is connected to the line 93. The relay 103 is provided with a two-way contactor 104 and a two-way contactor 105. One side of the contactor 104 is connected to the line 52 and one side of the contactor 105 is connected to the line 53. The other side of the contactor 104 of the relay 103 is provided with two posts 106 and 107, while the other side of the contactor 105 is provided with posts 108 and 109. The posts 106 and 108 are joined by a line 111; the post 109 is connected by a line 112 to post #3 of the plug 51. The test circuit 14 is also provided with two double-throw switches 113 and 114 which are mechanically connected so that their movable elements move together when desired. The movable element of the switch 114 is connected by a line 115 to the post 106. The movable element of the switch 113 is connected by a line 116 to the line 95. Both contactors of the switch 113 are connected by a line 117 to the line 101. One contactor of the switch 114 is connected by a line 118 to the post 107 of the switch 104. It is also connected by a line 119 to the #2 post on the plug 51 and, therefore, is provided with a minus 12-volt charge. The line 112 leading from the post 109 of the switch 105 to the post #3 of the plug 51 is also connected to the other post of the switch 114. One side of the switch 99 is connected by a line 121 to the line 118, while the other side of the switch is connected by a line 122 to the line 115.

Lamp circuit

The lamp circuit 82 is connected by a line 123 to one of the contactors 89 of the scanner 81. This line is connected to one side of a resistor 124, the other side of which is connected to the base of a PNP transistor 125 (type 2N404). The lamp circuit 82 is also provided with an NPN transistor 126 (type 2N585) and an incandescent lamp 127 having a filament 128. The line 112 is connected by a line 129 to one side of a resistor 131, the other side of which is also connected to the base of the transistor 125. The base of the transistor 125 is also connected by a line 132 to one side of a resistor 133, the other side of which is connected by a line 134 to the collector of the transistor 126. The line 134 is also connected to one side of a resistor 135, the other side of which is connected by a line 136 to post #1 of the plug 51 and, therefore, receives a plus 12-volt charge. The transistor 125 is of the PNP type and its collector is connected by a line 137 to a common point 138 which, in turn, is connected to one side of the filament 128. The common point 138 is connected to one end of the coil 139 of a normally open relay 141, the other side of the coil 139 being connected to the other side of the filament 128. The common point between the filament 128 and the coil 139 is connected by a line 142 to the emitter of the transistor 126 and to the line 119. The common point 138 is also connected through a resistor 143 to the base of the transistor 126. The emitter of the transistor 125 is connected by a line 144 to the line 136 (which it will be recalled was connected to the plus 12-volt post #1 of the plug 51). One side of the normally open contactor of the relay 141 is connected by a line 145 to the line 85 leading to the post #8 of the plug 51, while the other side of the switch 141 is connected to a line 146 which, in turn, is connected to one side of a motor 147. The other side of the motor is connected by a line 148 to the line 84 which is connected to the post #7 of the plug 51.

Elapsed time circuit

The elapsed time circuit 15 is provided with a normally open switch 149, one side of which is connected by a line 151 to the line 145 and the other side of which is connected by a line 152 to the line 146. The motor 147 is provided with a shaft extension 153 on which is mounted a dial 154 which indicates elapsed time and on which is also mounted a cam 155 having an abutment which, on occasion, engages the switch 149 and closes it. The motor 147, the dial 154, the shaft 153, the cam 155 and the switch 149 make up a clock; although these parts are shown schematically, it will be understood that the clock is of the well-known type which is correctable to a zero reading by an electrical impulse to a reset clutch; when the correction pulse is received by the clock, the dial is rotated at a high rate of speed (60 times normal speed) until zero is reached. The dial 154 is connected to a reset clutch solenoid 156 having a coil 157 which is adapted to receive the correction pulse. A 5 r.p.h. motor 158 is provided with a shaft extension 159 on which is mounted a cam 161, a cam 162, and a cam 163. The cams 161 and 163 are provided with small fingers or abutments, while the cam 162 is provided with a long abutment or raised portion. The cam 161 is in position to engage, on occasion, a normally closed switch 164, while the cam 163 is in position to engage with its abutment, on occasion, a normally open switch 165. The cam 162 is in such a position so that its elongated abutment can engage a normally open switch 166 and a normally closed switch 167. One end of the coil 157 of the reset solenoid 156 is connected by a line 168 to one side of the coil 169 of a relay 171 having a normally open contactor 172 and a normally open contactor 173. The side of the coil 171 which is connected to the line 168 is also connected by a line 174 to one side of the switch 164, the other side of which is connected to one side of the motor 158. One side of the contactor 173 is connected to the line 174, while the other side is connected by a line 175 to the side of the motor 158 to which the switch 164 is connected. The other side of the motor 158 is connected by a line 176 to the line 148 leading from the motor 147 to the line 84. The line 174 is also connected by a line 177 to the line 145 which, in turn, is connected to the line 85. One side of the switch 172 is connected by a line 178 to one side of a manual reset push button 179, the other side of which is connected by a line 181 to one side of the normally closed switch 167. The other side of the switch 172 is connected by a line 182 to the other side of the switch 167. The line 182 is also connected to the end of the coil 171 opposite the end to which is connected the line 174. One side of the normally open switch 166 is connected by a line 183 to the line 148 leading from the motor 147 to the line 84, while the other side is connected by a line 184 to the end of the coil 97 of the relay 96 opposite the end which is connected to the line 95. The line 178 is connected by a line 185 to the line 148. The line 178 is also connected to one side of the switch 165, the other side of which is connected through a disengaging switch 186 to the end of the reset solenoid coil 157 opposite the end which is connected to the line 168.

*Operation*

The operation of the apparatus will now be readily understood in view of the above description. First of all, it will be understood from an examination of the circuitry that the line 52 carries a minus 12-volt charge, the line 53 carries a plus 6-volt charge, the line 54 is arranged to carry a correction pulse, and the line 55 is intended to carry a status indicating pulse. The power supply 11 operates in the usual way to rectify the alternating current and smooth out any ripple by means of the filter and the zener diode voltage regulator before supplying the D.C. charge to the plugs 32 and 51. The motor 83 operates through the shaft extension to rotate the contact arm 88 over the contactors 89, thus connecting each of the lamp circuits 82 successively to the line 55. At the same time that the motor 83 is rotating the scanner 81, the motor 74 is rotating the cams 78 and 79. Let us assume, for the sake of description, that the lamp circuit 82 shown in the drawings and connected to the contactor 89 of the scanner 81 is associated with the remote station 13, also shown in the drawings. The finger or abutment on the cam 79 is related to the beginning of the cycle by the same length of time that the contactor 89 is related to the beginning of the scanning cycle, so that at the moment that the contact arm 88 rests on the contactor 89, the abutment on the cam 79 closes the normally open switch 67. Now, the line 52 is constantly provided with a charge of minus 12 volts, whereas the line 53 receives a charge of plus 6 volts at all times. If the lamp 61 is "on," the photoelectric cell 62 energizes the coil 59, so that the contact member 63 strikes the contactor 64, thus connecting the line 52 (with its minus 12 volts) to the line 66. This pulse or signal is carried through the switch 67 (which, at that moment, is closed) to the line 68 and to the line 55. The minus 12-volt pulse thus transmitted to the line 55 passes through the contact arm 88, the contactor 89, and the line 123 into the lamp circuit 82. If, however, the lamp 61 is "off," the photoelectric cell 62 will energize the relay 58 and draw the contact member 63 over to the contactor 65 so that a plus 6-volt charge will appear on the line 55 and be transmitted through the line 123 to the lamp circuit 82, whose operation will be described more fully hereinafter.

Now, in order for the scanning system to work effectively, the scanner 81 must start its cycle at the same time that the motor 74 and the cam 79 start to rotate through their cycle. In order to maintain these two elements in step, the cam 78 strikes the switch 76 and cuts off current to the motor 74 a short time period before the end of the minute. It will be remembered that the motor 83 is rotating at 5/6 r.p.m., while the motor 74 is rotating at 1 r.p.m.; so that the motor 83, therefore, is much slower than the motor 74 and will not reach the end of a complete rotation as quickly. The motor 74, therefore, reaches the point where the abutment on the cam 78 opens the normally closed switch 76 and this de-energizes the motor. The cam 78, of course, keeps the switch 76 open because the cam remains with its abutment on the switch when the motor stops. It will be understood that all of the motors corresponding to the motor 74 in all of the remote stations 13 are stopped well before the motor 83 has completed its single rotation. A short time later the motor 83 completes its circuit and the abutment on the cam 87 opens the switch 92 and closes the switch 91. The closure of the switch 91 causes the charge from post #6 of the plug 51 to pass through the switch 91, through the line 54, and through the coil 69 to the line 53. The energization of the coil 69 causes the relay 71 to be actuated and closed, thus constituting a jumper across the switch 76 which has been held open by the cam 78. The motor 74 starts up again; all of the remote station motors are in step at time zero with the motor 83 of the scanner.

Now, a minus 12-volt pulse on the PNP transistor 125 will cause current flow through the transistor. Current will flow from the line 136 through the transistor 125, through the line 137 to the common point 138, and from the common point through the filament 128, through the line 82 and the line 142 to the line 119. There is a difference of 12 volts between the line 136 and the line 119 and this lights the lamp 127. Of course, when the contact arm 88 leaves the contactor 98, the minus 12-volt pulse will disappear from the line 123. Nevertheless, it is desirable that the lamp 127 remain lighted during the rest of the cycle until the scanner again examines the condition signal from the particular remote control station 13. The flow of current produced through the transistor 125 causes a positive charge to appear on the line 137 and this operates through the resistor 143 to place a positive charge on the base of the NPN transistor 126. It is the nature of such a transistor to be turned on by a positive pulse of this type and, therefore, current flows through the transistor 126. Current, therefore, flows from the line 119 and the line 142 through the transistor 126 along the line 134, through the resistor 135 to the line 136. The negative charge thus produced through the resistor 133 and to the base of 125 holds the transistor 125 in "firing" condition so that the lamp remains lighted. In other words, the operation of the resistor 133 causes a negative charge to be applied to the base of the transistor 125 because that is the charge which appears on the line 132, due to the flow of current through the transistor 126. Therefore, the disappearance of the original negative pulse from the line 123 and from the contactor 89 makes no difference, since the negative pulse applied through the line 132 continues to produce current through the transistor 125 and to cause the lighting of the lamp 127. The lamp 127 will remain on, therefore, as long as the status indication from the remote station 13 periodically indicates a proper condition; for instance, the fact that the lamp 61 is lighted. If, before the next cycle, something happens and the light 61 goes into an "off" condition, the next time the contact arm 88 strikes the contactor 89, it will send a plus 6-volt pulse through the line 123 and the resistor 124 to the transistor 125. Since the transistor 125 is of the PNP type, this will mean that it will go into an "off" condition and current will not flow through the filament 128 of the lamp 127, thus causing the lamp to be extinguished. This positive pulse appears on the base of the transistor 125 and overcomes the negative pulse which has appeared from the holding circuit provided by the transistor 126, so that not only is the current flowing through the transistor 125 shut off, but a positive pulse does not appear on the NPN transistor 126 any more so that current does not flow through it and the negative holding pulse no longer appears on the line 132 to hold the transistor 125 in "on" condition. The lamp 27, therefore, will remain unlighted until such time as the proper negative pulse again appears on the line 123.

During the time that current flows through the filament 128 and the lamp 127 is "on," indicating a certain condition at the remote station 13, a similar current flows through the coil 139 of the relay 141 and closes its normally-open contactor. This causes current to flow through the motor 147 and rotates the shaft 153 which the effect of increasing the value which is indicated by the dial 154 of the clock. Intermittent changes in the condition at the remote station will be added up automatically on the dial 154 until such time as an operator presses the reset button 179 and brings the dial 154 back to zero through the medium of the reset clutch solenoid 156. The reset feature of the elapsed time circuit may be taken out of operating condition by opening the disengaging switch 186, if desired. The motor 158 and its cams 161, 162, and 163 (along with the associated equipment) is intended to operate the motor 147 at high speed in order to move the dial 154 to "zero" position quite rapidly by a so-called "correction cycle" similar to that used in the daily correction of secondary supervised clocks. The reset clutch solenoid 156 has the ability to throw in certain gears between the clock motor 147 and the dial 154 to make the dial operate at high speed so that it can be rotated forward to zero in a short time. If the dial 154 is lined for 24-hour indication and the lamp 127 has been on for only an hour in the last 24 hours, it would normally take 23 hours to move the dial back to zero again, which, of course, is impractical. Pressing on the reset button 179 causes several things to take place. First of all, the coil 169 of the relay 171 is energized. Current flows through the coil 169 and closes the normally open contactors 172 and 173. Closure of the contactor 173 causes current to flow from the line 145 through the line 177 through the switch 173 through the line 175 through the motor 158 and the line 176 to the line 148, so that the motor 158 is also energized. The motor 158 turns the cam 163 until its abutment closes the contacts 165 for a period of 28 seconds. Current flows through the contacts 165 to the coil 157 of the clutch magnet 156. The energization of the reset clutch coil 157 causes the cam 155 to close the switch 149 and allow current to pass to the motor 147. Now, the apparatus is arranged so that, when the dial 154 reaches zero, the switch 149 will be opened again and the motor 147 will not rotate until the lamp 127 comes on. Even after the reset push button 179 has been released, all of these elements will be held in by the relay 171, since rotation of the motor 158 will bring the elongated abutment of the cam 162 against the switch 166 which acts as a holding switch so that, even though the switch 179 is later opened by release of the button, the relay 171 will not drop out. At most, the correction of the dial 154 will take a certain short length of time. For that reason, the elongated abutment on the cam 162 is selected so that the reset clutch magnet stays in until well after the clock motor has stopped, due to the opening of the switch 149. It can be seen that the motor 158 and its associated equipment, including the relay 171, permit the motor 147 to be energized even though it is not supplied with current from the relay 141 and allows it to operate at a rapid rate of rotation until such time as it has been allowed to rotate the dial 154 to zero. At such time, the cams drop all circuits and return things to their "normal" condition. It is interesting to note that the cam 162 has the additional function of closing the normally open switch 166 causing energization of the coil 97 of the relay 96.

The test circuit 14 is used to impress on the lamp circuit 82 of the master station a signal equivalent to that which would arrive at the master station from the various remote stations, either if the status switch were in "on" position or in "off" position. To test for "on" position, the switches 113 and 114 are moved so that the contactors contact the upper posts. This impresses on the line 55 a negative pulse which, therefore, appears at all of the contactors 89 in turn so that in one minute all of the lamps 127 should be turned on. When the switches 113 and 114 are moved to "off" position (with the contacting arm contacting the bottom post), a positive pulse is applied to all of the lines 123 so that all of the lamps 127 should be turned off in one minute. Failure of any lamp to conform to this "on" or "off" test would indicate something wrong in the circuitry. When the cam 162 has been rotated at the beginning of a reset cycle so that it closes the normally open contactor 166 and energizes the coil 97 of the relay 96, the switch 98 is closed, causing current to flow through the coil 102 of the relay 103 and to move the contactors to the upper posts 105 and 108. This gives the effect, so far as the lamp circuit 82 is concerned, that would take place if the switches 113 and 114 were put in test "on" position and serves to hold the test condition for a complete cycle. Therefore, a negative 12-volt signal is placed directly on the lamp circuits, so that all of the lights come on. The effect of this, of course, is to close all the control relays 141 so that the motor 147 is supplied with current to rotate it during the reset cycle. Of course, the closure of the switches 98 and 99 of the reset control relay 96 causes the relay 102 to lock in and hold the circuit even after the reset button 179 has been released. As has been stated, the pressing of the reset button 179 also causes the energization of the relay 171 which causes the motor 158 to be energized through the normally open contactor 173. Rotation of the motor 158 causes the cam 163 to strike the normally open switch 165 for a long pulse (approximately 28 seconds) to the reset clutch coil 157. Energization of this clutch is long enough to start the reset mechanism of the motor 147 and the dial 154 in motion. The motor 147 rotates until the dial 154 reaches the zero point at which time it stops again, this being accomplished by means of the switch 149 and the cam 155. Finally, the cam 161 by rotating and opening the normally closed switch 164 causes the motor 158 to drop out.

FIG. 2 shows a variation of the lamp circuit in which a lamp circuit 186 is shown as including a PNP transistor 187, an NPN transistor 188, and a neon lamp 189 adapted to be connected across 115-volt A.C. power lines 191 and 192. In series with the lamp 189 between the power lines is a normally open contactor 193 of the relay 194 having a coil 195. Associated with the apparatus is a line 196, a line 197, and a line 198. The line 197 is connected to a plus 6-volt charge, while the line 198 is connected to a minus 6-volt charge. It is the nature of the PNP transistor 187 to fire or pass current when a negative pulse is received on it and of the NPN transistor 188 to fire when a sufficient positive pulse is received on it. Also extending into the lamp circuit is a line 199, a line 201, and a line 202. The lines 201 and 202 are two lines of a multiple wire conductor connecting the master station to a plurality of remote stations. The system used is a binary system, wherein each remote station is connected to also two of the wires, but there is no duplication of the two wires to which any two remote stations or any two lamp circuits are connected. Thus, there is only one remote station which sends signals over the lines 201 and 202, on occasion. If the status switch in the remote station indicates that a first condition prevails at that station, it will send a negative pulse over the line 201 and a negative pulse over the line 202. The base of the transistor 187 is connected to a line 203 which is connected through a resistor 204 to a line 205 joined to the signal-bearing line 201. In a similar manner, the line 203 is connected to one side of a resistor 206 which is connected through a line 207 to the signal-bearing line 202. The line 203 is connected through a variable resistor 208 and a fixed resistor 210 to the line 197 which carries a charge of plus 6 volts. The emitter of the transistor 187 is connected by a line 209 to the line 196. The collector of the transistor 187 is connected through a rectifier 211 and the coil 195 of the relay 194 by a line 212 to the line 199. A common point between the rectifier 211 and the coil 195 is connected by a resistor 213 to one side of a normally open contactor 214 of a relay 215. The other side of the contactor is connected to the line 196, while the coil 216 of the relay 215 is connected on one side to the line 196 and on the other side to the collector of the transistor 188. A line 217 is connected to the base of the transistor 188 and through a variable resistor 218 and a fixed resistor 220 to the line 198. The line 217 is also connected through a resistor 219 to the line 205 leading to the line 201; it is connected through a resistor 221 to the line 207 leading to the line 202. The emitter of the transistor 188 is connected by a line 222 to the line 199.

The operation of the lamp circuit 186 is similar to that of the lamp circuit 82 of FIG. 1. As has been stated, the lines 201 and 202 are two lines of a binary system, so that the signals which appear on the lines 201 and 202 are distinctly identifiable with only a single, known remote station, although either one of those lines may be used for part of a binary signal from another remote station. In any case, if two negative signals appear on the lines 201 and 202, indicating a first condition at the remote station, these voltages will appear on the base of the transistor 187 and cause it to fire, which will cause current to pass from the line 196 to the line 209 through the transistor 187, the rectifier 211, the coil 195 of the relay 194, and the line 212 to the line 199. The energization of the coil 195 causes the contactor 193 to close and cause current to flow through the neon tube 189 so that it lights. If the condition at the remote station changes, then it will cause two positive pulses to appear on the lines 201 and 202 and this will cause the transistor 187 to stop firing and drop out these neon lights. The NPN transistor forms a holding circuit for the relay 194 by use of the relay 215; the relay 215 drops out when the positive charge appears on the base of the transistor 188 and neutralizes the negative firing charge which appeared there when the transistor 187 was initially fired.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A supervisory system, comprising a master station including a scanner and including a motor for driving the scanner, a plurality of indicator circuits with which the scanner makes successive connection, a remote station corresponding to each of the indicator circuits and including a motor operating on local power, the master station motor operating at a slower rate than the remote station motor, the remote station motors stopping a period of time before the completion of a scanner rotation, means transmitting a starting signal to the remote station at the start of a scanner rotation, wires connecting each remote station to the master station, said wires including a first wire having a negative electrical charge, a second wire having a positive electrical charge, and a third wire connecting the remote station to the scanner, a status switch in each remote station, each indicator circuit being responsive to one type of signal from a status switch to register a first condition and being responsive to another type of signal from the status switch to register a second condition, and means associated with each remote station to connect the status switch of that remote station to the scanner only at the time that the scanner makes contact with the indicator circuit corresponding to that remote station, the status switch connecting one of the first and second wires to the third wire, and means for applying selectively to the scanner a continuous signal similar to either of the two signals which would be received from a status switch in two corresponding conditions.

2. A supervisory system, comprising a master station including a scanner and including a motor for driving the scanner, a plurality of indicator circuits with which the scanner makes successive connection, a remote station corresponding to each of the indicator circuits and including a motor operating on local power, the master station motor operating at a slower rate than the remote station motor, the remote station motors stopping a period of time before the completion of a scanner rotation, means transmitting a starting signal to the remote station at the start of a scanner rotation, wires connecting each remote station to the master station, said wires including a first wire having a negative electrical charge, a second wire having a positive electrical charge, and a third wire connecting the remote station to the scanner, a status switch in each remote station, each indicator circuit being responsive to one type of signal from a status switch to register a first condition and being responsive to another type of signal from the status switch to register a second condition, and means associated with each remote station to connect the status switch of that remote station to the scanner only at the time that the scanner makes contact with the indicator circuit corresponding to that remote station, the status switch connecting one of the first and second wires to the third wire, and means for applying selectively to the scanner a continuous signal similar to either of the two signals which would be received from a status switch in two corresponding conditions, each indicator circuit including a first element adapted to pass current in response to a first signal of condition, a lamp connected to the first element adapted to light when current is passed by that element, a second element adapted to pass current in response to a second signal of condition, means for maintaining the lamp in lighted condition despite removal of the first signal from the first element, and means associated with the second element to turn off the lamp when current is passed by that element.

3. A supervisory system, comprising a master station including a scanner and including a motor for driving the scanner, a plurality of indicator circuits with which the scanner makes successive connection, a remote station corresponding to each of the indicator circuits and including a motor operating on local power, the master station motor operating at a slower rate than the remote station motor, a cam on each of the remote station motors stopping them a period of time before the completion of a scanner rotation, a cam driven by the master station motor for transmitting a starting signal to the remote station at the start of a scanner rotation, wires connecting each remote station to the master station, said wires including a first wire having a negative electrical charge, a second wire having a positive electrical charge, a third wire connecting the remote station to the scanner, and a fourth wire for transmitting the said starting signal, a status switch in each remote station, each indicator circuit being responsive to one type of signal from a status switch to register a first condition and being responsive to another type of signal from the status switch to register a second condition, means associated with each remote station to connect the status switch of that remote station to the scanner only at the time that the scanner makes contact with the indicator circuit corresponding to that remote station, the status switch connecting one of the first and second wires to the third wire, and test means for applying selectively to the scanner a continuous signal similar to either of the two signals which would be received from a status switch in two corresponding conditions.

4. A supervisory system, comprising a master station including a scanner and including a motor for driving the scanner, a plurality of indicator circuits with which the scanner makes successive connection, each indicator circuit consisting of a PNP transistor having a base, emitter, and collector electrodes, an NPN transistor having a base, emitter, and collector electrodes, and a lamp, the collector electrode of the PNP transistor being connected to the base electrode of the NPN transistor, the collector electrode of the NPN transistor being connected to the base of the PNP transistor to provide a negative potential to latch the PNP transistor in conducting condition, the lamp being connected at one end to the emitter of the NPN transistor and at the other end to a common point between the collector of the PNP transistor and the base of the NPN transistor, a remote station corresponding to each of the indicator circuits and including a motor operating on local power, the master station motor operating at a slower rate than the remote station motor, the remote station motor stopping a period of time before the completion of a scanner rotation, means transmitting a starting signal to the remote station at the start of a scanner rotation, wires connecting each remote station to the master station, said wires including a first wire having a negative electrical charge, a second wire having a positive electrical charge, and a third wire connecting the remote station to the scanner, a status switch in each remote station, each indicator circuit being responsive to one type of signal from a status switch to register a first condition and being responsive to another type of signal from the status switch to register a second condition, and means associated with each remote station to connect the status switch of that remote station to the scanner only at the time that the scanner makes contact with the indicator circuit corresponding to that remote station, the status switch connecting one of the first and second wires to the third wire, and means for applying selectively to the scanner a continuous signal similar to either of the two signals which would be received from a status switch in two corresponding conditions.

References Cited by the Examiner
UNITED STATES PATENTS

| | | | |
|---|---|---|---|
| 2,449,304 | 9/1948 | Lamb | 340—183 |
| 2,504,931 | 4/1950 | Knudsen | 340—183 |
| 2,506,394 | 5/1950 | Strange | 340—213 |
| 2,573,175 | 10/1951 | Bergen et al. | 340—147 |
| 2,578,447 | 12/1951 | Odell et al. | 340—184 |
| 2,816,238 | 12/1957 | Elliott | 340—147 |
| 2,883,255 | 4/1959 | Anderson | 340—213 |
| 2,883,651 | 4/1959 | Akerlund | 340—213 |
| 2,905,520 | 9/1959 | Anderson | 340—213 |
| 3,065,462 | 11/1962 | Maltby et al. | 340—213 |
| 3,090,039 | 5/1963 | Walls | 307—88.5 |
| 3,099,000 | 7/1963 | Dunning | 307—88.5 |

NEIL C. READ, *Primary Examiner.*